United States Patent
Bruzy et al.

(10) Patent No.: US 8,554,405 B2
(45) Date of Patent: *Oct. 8, 2013

(54) METHOD OF IDENTIFICATION OF THE NODES OF A COMPUTER NETWORK IN AN AIR CONDITIONING INSTALLATION OF A MOTOR VEHICLE, AND AIR CONDITIONING INSTALLATION USING THE METHOD

(75) Inventors: Christophe Bruzy, Beynes (FR); Vincent Aubry, Orsay (FR); Bertrand Puzenat, Montigny le Bretonneux (FR); Laurent Rede, Paris (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/905,322

(22) Filed: Oct. 15, 2010

(65) Prior Publication Data

US 2011/0060501 A1 Mar. 10, 2011

Related U.S. Application Data

(63) Continuation of application No. 10/469,128, filed as application No. PCT/FR02/00676 on Feb. 22, 2002, now Pat. No. 7,869,918.

(30) Foreign Application Priority Data

Feb. 26, 2001 (FR) ...................................... 01 02554

(51) Int. Cl.
*G06F 7/00* (2006.01)
(52) U.S. Cl.
USPC ............. 701/36; 370/236; 370/257; 709/223; 709/253
(58) Field of Classification Search
USPC .................... 701/36; 370/236, 257; 709/223, 709/253
See application file for complete search history.

(56) References Cited

U.S. PATENT DOCUMENTS

| | | |
|---|---|---|
| 5,051,987 A | 9/1991 | Conlon |
| 5,194,755 A | 3/1993 | Rhee et al. |

(Continued)

FOREIGN PATENT DOCUMENTS

| | | |
|---|---|---|
| DE | 19742179 C1 | 11/1998 |
| EP | 0675437 A2 | 10/1995 |

(Continued)

OTHER PUBLICATIONS

English language abstract for DE 19742179 extracted espacenet.com database, 7 pages.

(Continued)

*Primary Examiner* — Cheyne Ly
(74) *Attorney, Agent, or Firm* — Howard & Howard Attorneys PLLC

(57) ABSTRACT

In a motor vehicle air conditioning installation comprising a central control unit (12), a computer network (14) connected to the central control unit (12) and a plurality of peripherals ($10_1$, $10_2$, $10_3$, ..., $10_n$) connected to nodes ($N_1$, $N_2$, $N_3$, ..., $N_n$) of the computer network, the peripherals are connected in series via a common conductor (18). The installation comprises means (120) for inputting at the level of each peripheral an electric signature on a common conductor, means (130) for detecting an electric signal depending upon the electric signatures of the peripherals situated upstream on the common conductor (18), means for generating a data item representing the relative position of the peripheral on the basis of the electric signal detected, and means for identifying the node of the network to which it is connected on the basis of the relative position data item generated. The identification of the node of the network permits the assignment of an address or monitoring of the connection of the peripheral from the central control unit.

10 Claims, 15 Drawing Sheets

(56) References Cited

U.S. PATENT DOCUMENTS

| | | |
|---|---|---|
| 5,608,729 A | 3/1997 | Orsic |
| 5,689,675 A | 11/1997 | Buij et al. |
| 6,147,967 A * | 11/2000 | Ying et al. ............... 370/222 |
| 6,166,653 A | 12/2000 | Schulmeyer et al. |
| 6,392,558 B1 | 5/2002 | Schulmeyer et al. |
| 6,427,167 B1 | 7/2002 | Siedel |
| 2001/0002451 A1 | 5/2001 | Breed |
| 2002/0047628 A1 | 4/2002 | Morgan et al. |
| 2004/0078097 A1 | 4/2004 | Bruzy et al. |
| 2004/0098514 A1 | 5/2004 | Schuster |

FOREIGN PATENT DOCUMENTS

| | | |
|---|---|---|
| EP | 0843260 A1 | 5/1998 |
| FR | 2788146 A1 | 7/2000 |

OTHER PUBLICATIONS

English language abstract for FR 2788146 extracted from espacenet.com database, 10 pages.

PCT International Search Report for PCT/FR02/00676, dated Jul. 22, 2002, 3 pages.

* cited by examiner

METHOD OF IDENTIFICATION OF THE NODES OF A COMPUTER NETWORK IN AN AIR CONDITIONING INSTALLATION OF A MOTOR VEHICLE, AND AIR CONDITIONING INSTALLATION USING THE METHOD

CROSS REFERENCE TO RELATED APPLICATION

This application is a continuation of prior application Ser. No. 10/469,128, filed Aug. 26, 2003, which claims priority to and all the advantages of International Application No. PCT/FR2002/000676, filed on Feb. 22, 2002, which claims priority to France Patent Application No. 01/02554, filed on Feb. 26, 2001.

BACKGROUND TO THE INVENTION

The present invention relates to the identification of the nodes of a computer network in an air conditioning installation of a motor vehicle.

The application envisaged by the invention is more particularly the assignment of addresses to peripherals connected to the nodes of the network. However, the invention is equally applicable to the monitoring of the connection of peripherals provided with particular fixed addresses.

Air conditioning installations of motor vehicles comprise a certain number of elements such as actuators for air distribution or mixing flaps, fans, temperature sensors. These elements are connected to a central control unit in order to receive control data and/or to send status data to it.

The increased sophistication of air conditioning installations is reflected in an ever increasing number of component elements. In order to avoid the need for bulky and expensive bundles of conductors, it is known to connect these different elements to a computer network (or bus) which is connected to the central control unit and through which the control data and the status data pass.

It is then necessary to program the addresses of the elements which form peripherals of the computer network of the air conditioning installation.

It is known for hardware-type programming of addresses to be carried out by physical coding effected in the housing of each peripheral or in the connector connecting the peripheral to the computer network. Such hardware addressing has the drawback of being fixed. Furthermore, if it is effected before the connection of the peripherals it poses several problems:

- a problem of logistics since it is then necessary to reference the different peripherals in a different manner even through they may be identical, except for their address, such as for example actuators of flaps, fans or sensors,
- a problem of monitoring after connection in order to detect any errors of connection due to similarities between peripherals of the same type.

It is also known for software-type programming of addresses to be carried out after connection of the peripherals to the computer network. This programming is carried out individually, from the central control unit via the network, by accessing each new peripheral installed by its address which, in the usual manner, is initially fixed at the value 0. Such programming is relatively long and leads to the assignment to each peripheral of its own permanent address. Moreover, during repair involving replacement of a peripheral, programming of the address of the new peripheral is necessary.

OBJECT AND SUMMARY OF THE INVENTION

The object of the invention is to provide a method of identification of the nodes of a computer network in an air conditioning installation of a motor vehicle comprising a plurality of peripherals connected to respective nodes of a computer network connected to a central control unit, the said method making it possible in particular to avoid permanent differentiation between peripherals of one and the same type, that is to say peripherals of similar make-up, carrying out the same function (actuator, fan, sensor, for example).

This object is achieved by a method of identification comprising, in accordance with the invention, the steps which consist of:

- inputting at the level of each peripheral an electric signature on a common conductor,
- detecting at the level of each peripheral an electric signal depending upon the electric signatures of the peripherals situated upstream on the common conductor,
- generating at the level of each peripheral a data item representing a relative position of the peripheral on the basis of the electric signal detected at the level of this peripheral, and
- identifying each node of the network on the basis of the relative position data collected by the peripheral connected to this node.

Thus a peripheral may be simply identified by its location relative to the other peripherals on the common conductor.

Advantageously, at the level of each peripheral a signal is picked up on a shunt inserted into a conductor connecting the peripherals in series. In this way each peripheral is provided with a shunt which carries out a function of protection of the peripheral from overcurrents.

The common conductor may be a conductor connecting the peripherals to a reference potential, for example earth.

The common conductor may be the computer network connecting the peripherals to the central control unit.

The electric signature which is input on the common conductor may be in the form of a current of constant intensity or of a constant voltage. The data item representing the relative position of a peripheral is then generated on the basis of the intensity of the current or of the voltage appearing on the common conductor at the level of this peripheral.

Other forms of electric signatures may be used, for example particular waveforms, each peripheral being provided with appropriate means for detection of the electric signatures used.

According to a particular embodiment of the invention, after input of the electric signatures at the level of the peripherals, a data string is transmitted by the central control unit over the computer network, the data string comprising relative position data of peripherals each associated with a respective address data item, and each peripheral extracts from the data string transmitted the address data item associated with the relative position data item corresponding to that generated at the level of this peripheral.

The data item for the address of a peripheral may be generated directly on the basis of the detection of the current or voltage appearing on the common conductor at the level of this peripheral.

In the case of application to the programming of addresses of the nodes of the network, the address data item extracted at the level of a peripheral is memorised as the address of the network node to which this peripheral is connected. The address data item may be stored in a volatile manner such that the programming of addresses is reinitialised at each powering-up of the air conditioning device, and that the peripherals of one and the same type are undifferentiated when the air conditioning device is not powered up. The absence of differentiation of the peripherals of one and the same type makes it possible to use identical peripherals whilst avoiding the drawbacks of a multiplicity of references during provisioning and storage and the difficulties of distinguishing between similar peripherals at the time of connection.

In the case of application to the monitoring of connection of peripherals having particular pre-recorded addresses, the address data item extracted at the level of a peripheral is compared with an address data item stored in a permanent manner at the level of this peripheral.

A further object of the invention is to provide an air conditioning installation which permits the implementation of the method defined above.

This object is achieved by means of a motor vehicle air conditioning installation comprising a central control unit, a computer network connected to the central control unit and a plurality of peripherals connected to nodes of the computer network, wherein according to the invention in this device the peripherals are connected in series via a common conductor, and the installation comprises:

means for inputting at the level of each peripheral an electric signature on a common conductor, means for detecting at the level of each peripheral an electric signal depending upon the electric signatures of the peripherals situated upstream on the common conductor, means for generating at the level of each peripheral a data item representing a relative position of the peripheral on the basis of the electric signal detected at the level of this peripheral, and means for identifying each node of the network on the basis of the relative position data collected by the peripheral connected to this node.

BRIEF DESCRIPTION OF THE DRAWINGS

Other features and advantages of the method and the device according to the invention will become apparent upon reading the description which is given below by way of indication but is not limiting, with reference to the accompanying drawings, in which:

FIG. 6 is a flow chart showing the progress of a method of identification according to the invention which is applied to the assignment of addresses to the network nodes in an installation such as that illustrated by FIG. 3;

FIG. 8 is a flow chart showing the progress of a method of identification according to the invention which is applied to the monitoring of connection of the peripherals in an installation such as that illustrated by FIG. 3;

DETAILED DESCRIPTION OF EMBODIMENTS

Figure 1:
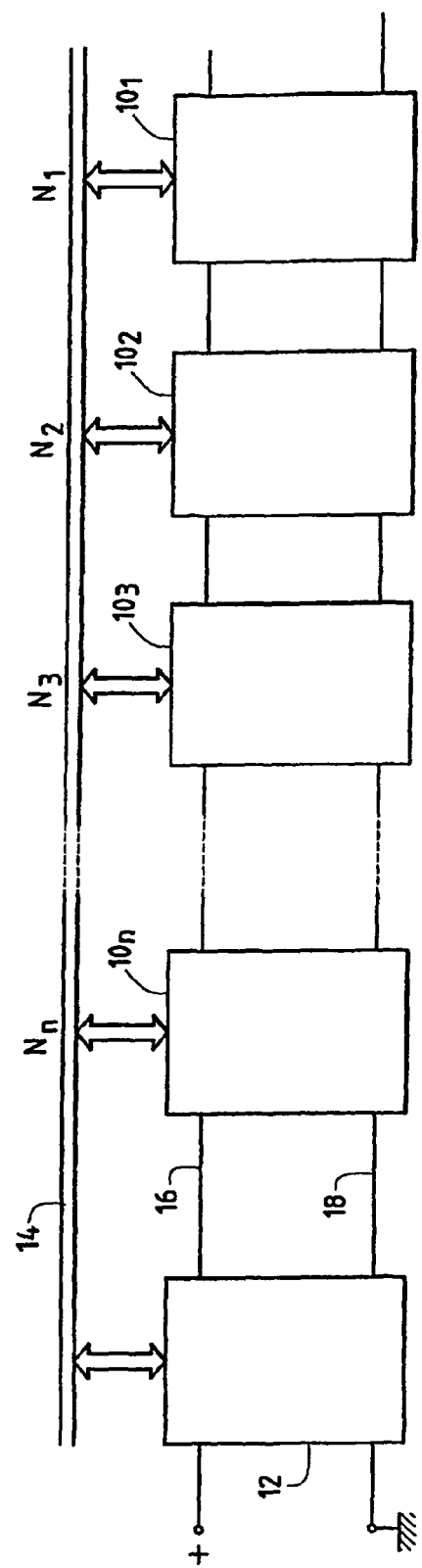
FIG. 1 is a very schematic partial view of an air conditioning installation.

As FIG. 1 shows very schematically, a motor vehicle air conditioning installation conventionally comprises a plurality of peripherals $10_1, 10_2, 10_3, \ldots, 10_n$, a central control unit 12, or network controller, and a computer network consisting of a data bus 14. The peripherals are connected to respective nodes $N_1, N_2, N_3, \ldots, N_n$ of the network 14 by which they are connected to the central unit 12.

The peripherals usually comprise a plurality of actuators to control the movements of air distribution and mixing flaps, one or more fans (blowers), one or more sensors consisting of temperature probes and a control panel. The central control unit receives status data originating from the peripherals and transmits control data to the peripherals in order to carry out the desired functions of ventilation, regulation of the temperature in the passenger compartment, demisting, de-icing, etc., controlled from the control panel.

The peripherals as well as the central control unit are connected to a common power supply conductor 16 carrying the vehicle battery voltage, or a voltage derived therefrom, and to a common conductor 18 connected to the earth (reference potential) of the vehicle.

Figure 2:
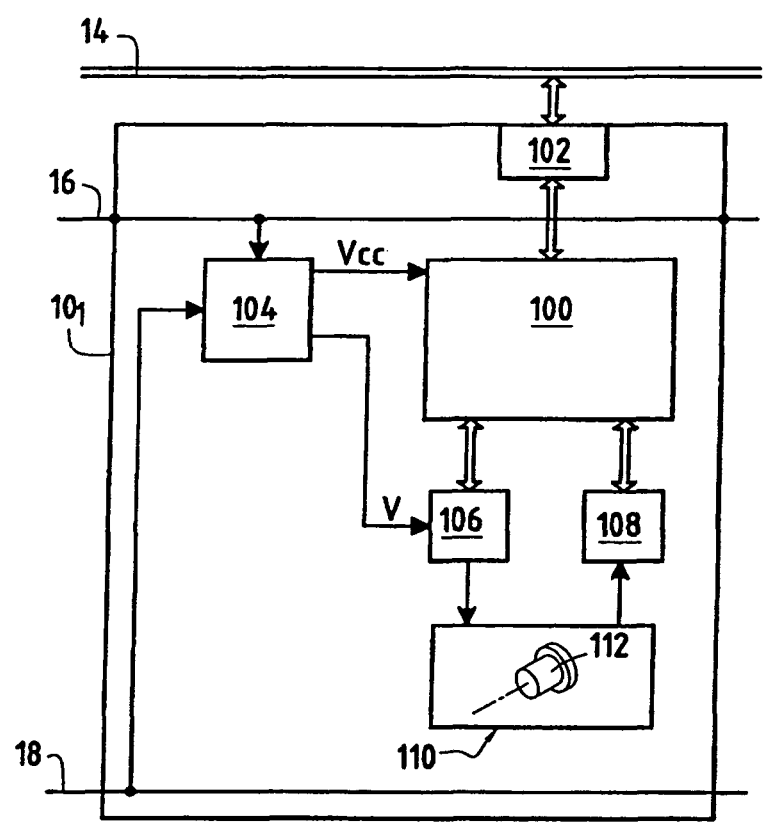
FIG. 2 is a general diagram of a peripheral of the installation of FIG. 1.

FIG. 2 shows in a more detailed manner the peripheral $10_1$ of FIG. 1, for example a flap actuator. This actuator comprises a control circuit 100 with a microprocessor connected to the computer network 14 by a bus interface 102. An electric supply circuit 104 connected to the conductors 16, 18 comprises circuits for filtering, protection and voltage regulation to deliver a logical supply voltage $V_{CC}$ to the control circuit 100 and a motor supply voltage V to an analogue interface circuit 106.

A geared motor 110 coupled to an air distribution or mixing flap (not shown) comprises a stepping motor 112 which receives from the interface 106 the voltage V in the form of pulse trains applied to the phases of the motor 112 at a given control frequency, under the control of the unit 100 to which the interface 106 is connected.

A data interface 108 is connected to the geared motor 110 and to the control circuit 100 in order to transmit to the latter status data, particularly data concerning the angular position of the flap.

An air conditioning installation and an actuator as briefly described above are well known to the person skilled in the art, as are peripherals which carry out the functions of fan or of sensor and each comprise a control circuit with a microprocessor and an electric supply circuit (individual or common to several peripherals), such that a more detailed description is not necessary.

According to the invention each peripheral is provided with a circuit permitting input of an electric signature on a common conductor, and means permitting detection of the electric signals depending upon the electric signatures input and passing through the common conductor at the level of this peripheral.

It will be noted that an electric signature or signal may be positive or negative. The input circuit is equivalent to an electromotive circuit corresponding to a voltage or current generator in the case of input of a positive electric signature and corresponding to a receiver in the case of input of a negative electric signature.

Furthermore, the common conductor on which an electric signature is input may be the data bus 14, the common power supply conductor 16, the common conductor connected to earth 18, or any other common conductor connecting the different peripherals $10_1$, $10_2$, $10_3$, ..., $10_n$ in series to the central unit 12.

Figure 3:
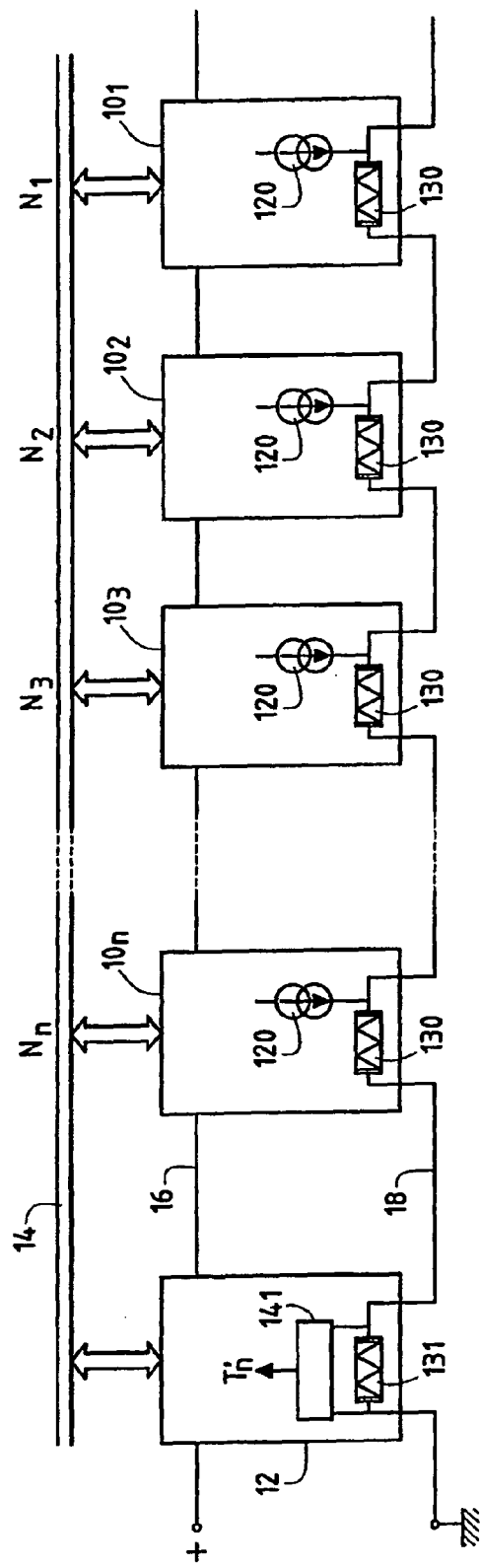
FIG. 3 is a very schematic partial view of an air conditioning installation according to the invention.

In the embodiment of FIG. 3, each peripheral $10_1$, $10_2$, $10_3$, ..., $10_n$ is provided with a circuit permitting input of an electric signature on the common conductor which is connected to earth 18.

Figure 4:
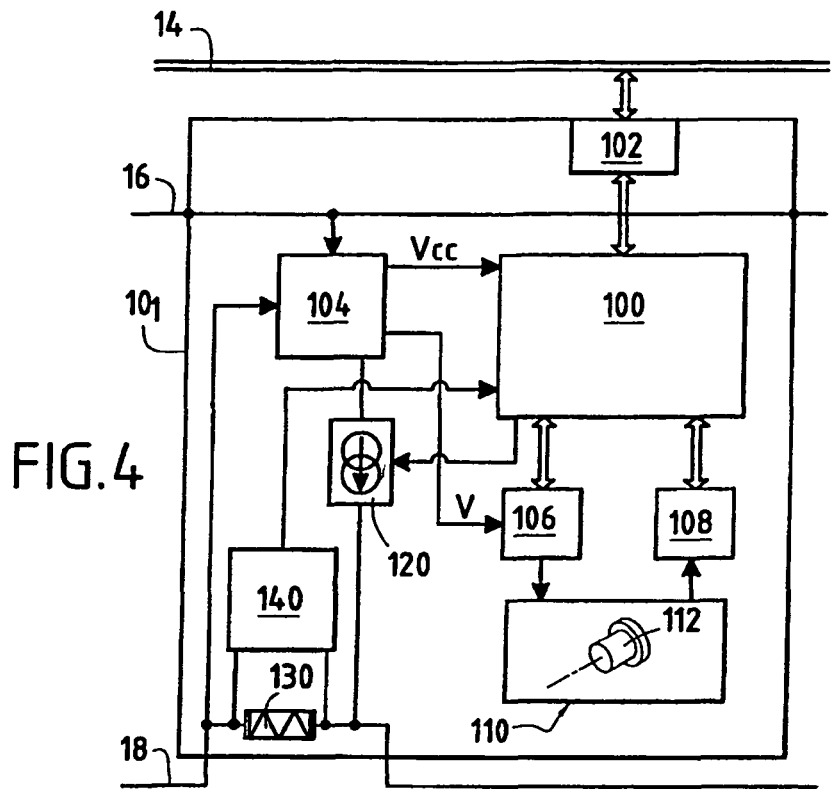
FIG. 4 is general diagram of a peripheral of the installation of FIG. 3.

In the example illustrated by FIG. 4, the circuit for input of the electric signature is formed by a constant direct current source 120 connected between the regulated supply circuit 104 and the common conductor 18. Furthermore, a shunt 130 is inserted into the common conductor 18 and a circuit 140 is connected to the terminals of the shunt 130 in order to supply a data item representing the intensity of the current passing through the shunt. In the example of FIGS. 3 and 4, the input of the electric signature at the level of the peripheral is carried out upstream of the shunt on the common conductor 18, in such a way that the shunt of a peripheral "sees" the electric signature thereof. The term "upstream" is used here in relation to the direction of current flow on the common conductor 18.

Thus the peripheral $10_1$ receives only its own electric signature, the peripheral $10_2$ receives the electric signatures of the peripherals $10_1$ and $10_2$, the peripheral $10_3$ receives those of the peripherals $10_1$, $10_2$, $10_3$, each peripheral receiving the signatures of those situated upstream on the common conductor 18 in addition to its own signature, up to the peripheral $10_n$ which receives the signatures of all the peripherals.

Moreover, a shunt or resistor 131 is inserted into the common conductor 18 at the level of the central control unit 12 (FIG. 1). A circuit 141 identical to the circuit 140 is connected to the terminals of the shunt 131 in order to supply a data item representing the intensity of the current passing through the shunt 131, the current cumulatively including the electric signatures of all the peripherals $10_1$, $10_2$, $10_3$, ..., $10_n$.

It will be noted that the shunts 130, 131 constitute not only elements for measuring intensity but also devices for protection against overcurrents. In the case of withdrawal of a peripheral, the continuity of the common conductor 18 can be preserved by closure of a switch between the terminals for connection of the shunt on the conductor 18.

Figure 5:
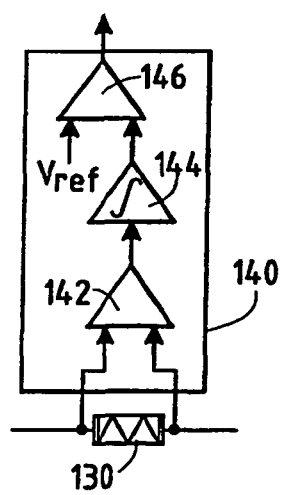
FIG. 5 is a detailed diagram of the circuit for detection of electric signatures of the peripheral of FIG. 4.

An embodiment of a circuit for measuring intensity 140 is shown in FIG. 5. The voltage at the terminals of the shunt 130 is amplified by an amplifier 142 and integrated by means of a linear or preferably quasi-linear integrator 144. The load at the output of the integrator is compared with a threshold value $V_{ref}$ by means of a comparator 146 which produces a signal when the threshold value is reached. The signal produced by the comparator is transmitted to the control circuit 100.

A process for identification of the peripherals $10_1$ to $10_n$ will now be described with reference to FIG. 6 in the case of programming addressed of peripherals connected into the air conditioning installation.

The process is carried out by means of programs stored in the memory of the central control unit 12 and the control circuits 100 of the peripherals.

On powering-up of the installation, the process is started (step 20) by control of input of electric signatures over the common conductor 18. For this purpose in each peripheral a control signal is delivered at the instant $t_o$ by the control circuit 100 to inject a direct current of intensity I over the conductor 18. The control signal is for example in the form of a pulse of duration $\Delta T$ applied via a static switch controlling the operation of the current source or inserted between the latter and the conductor 18. The values of the intensities I injected into the different peripherals are equal or substantially equal.

Figure 7:
FIG. 7 illustrates very schematically the variation of intensity of the current in the conductor common to the peripherals and to the central unit of the installation of FIG. 3.

FIG. 7 shows very schematically the distribution of the current intensity along the conductor 18 in response to the input of the electric signatures of all the peripherals.

In each control circuit, in response to the reception of the output signal of the comparator 136 the time elapsed since the instant $t_o$ is memorised in a memory of the control circuit 100 (step 22). The memorised elapsed times $T_1$, $T_2$, $T_3$, ..., $T_n$ in the peripherals $10_1$, $10_2$, $10_3$, ..., $10_n$ are inversely proportional to the respective measured current intensities $I_1$, $I_2$, $I_3$, ..., $I_n$, the integration by the integrator 144 leading to the threshold $V_{ref}$ all the more quickly as the intensity of the current rises. The duration $\Delta T$ is chosen in such a way as to be greater than the time $T_1$.

In a similar manner, in response to the emission of the output signal of the comparator of the circuit 141 the time $T'_n$ elapsed since the instant $t_o$ is memorised in the memory of the central control unit 12 (step 12). The time $T'_n$ is normally equal or practically equal to the time $T_n$.

In the following step 24, a data string is transmitted via the network 14 by the control unit and comprises relative position data of peripherals associated with address data of peripherals. The number n of peripherals being known, the position data are calculated in the following manner: $nT'_n$, $(n-1)T'_n$, $(n-2)T'_n$, ..., $T'_n$ and the associated address data are those of the peripherals which must be situated respectively at the locations of the nodes $N_1$, $N_2$, $N_3$, ..., $N_n$ of the computer network. The values $nT'_n$, $(n-1)T'_n$, $(n-2)T'_n$, ..., $T'_n$ must normally be equal or quasi-equal to the values $T_1$, $T_2$, $T_3$, ..., $T_n$ respectively.

It will be noted that in so far as the characteristics of the current sources and the circuit for detection of the peripherals are known and predetermined, the values $T_1$, $T_2$, $T_3$, ..., $T_n$ are also known and predetermined, to within a tolerance, and can be stored in the central control unit. It is not then necessary to sample the value $T'_n$ and to calculate the position data at the level of the central control unit.

In the following step (test 26), the string emitted by the central control unit is received by the control circuits 100 of the peripherals and the position data contained in the string are compared with those memorised in the control circuits.

When in peripheral a match is detected, with a predetermined tolerance, the associated address data item in the string with the position data item concerned is memorised in a memory of the control circuit 100 (step 28).

The memorised address data item constitutes the address of the node of the computer network to which the peripheral is connected, this address being recognised, at the level of the central control unit, as that of the particular function carried out by the peripheral.

Thus the invention is particularly advantageous in that it is sufficient that the addresses of the peripherals are pre-defined at the level of the central control unit in relation to the location of the peripheral in the air conditioning installation. No address storage in a peripheral prior to its connection is necessary.

Furthermore, the programming of addresses is a rapid automatic operation which can be carried out without inconvenience at each powering-up of the installation. The addresses can then be stored in volatile memories of the peripherals. When the installation is switched off, the peripherals do not have addresses, such that the peripherals of one and the same type are not differentiated. It is then possible, for peripherals of one and the same type, to use identical devices, which considerably simplifies the referencing of these devices, for provisioning and storage, as well as the operations of connecting to the construction or during repair of the air conditioning installations.

Although the method of identification according to the invention has a particularly advantageous application for the programming of addresses, it can equally be applied to the monitoring of connected peripherals with their addresses memorised by hardware or software means.

Such a monitoring process is illustrated by FIG. 8. It is distinguished from that of FIG. 6 in that when a match with predetermined tolerance is detected in step 26 at the level of a peripheral, the address data item associated with the position data item in the string received from the central control unit is compared with the address data item already memorised in the peripheral (step 30). Depending upon whether the result of the comparison is positive or negative, a correct connection message (step 32) or an error message (34) is sent from the peripheral to the central control unit.

Figure 9:
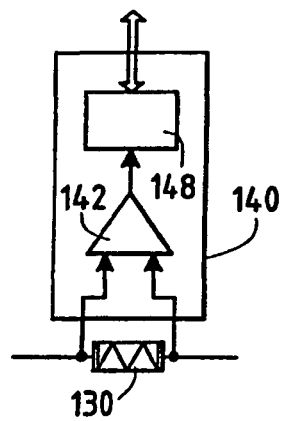
FIG. 9 is a detailed diagram of a variant of the design of a circuit for detection of electric signatures in a peripheral such as that of FIG. 4.

FIG. 9 illustrates a variant of the design of the circuit 140 (or 141) for measuring current connected to the terminals of a shunt. According to this variant, the voltage at the terminals of the shunt, amplified by the amplifier 142, is transmitted to an analogue/digital converter 148 which supplies the control circuit 100 directly in digital form with a data item directly representing the intensity of the current in the shunt.

Figure 10:
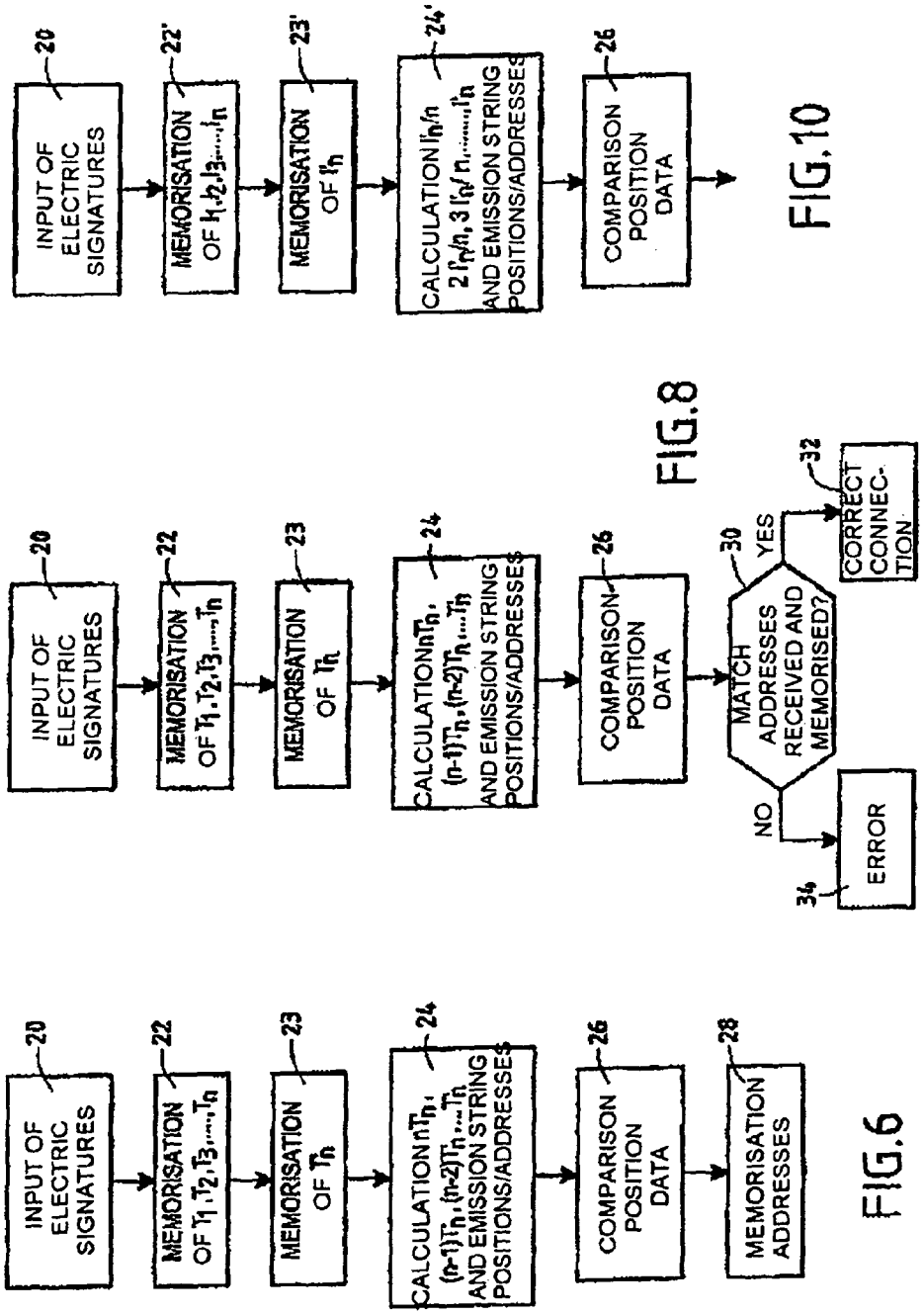
FIG. 10 shows a variant of the flow chart of FIG. 6.

The processes of FIGS. 6 and 8 may be modified in the following manner (FIG. 10).

Immediately after the start of the identification process (step 20), the values $I_1, I_2, I_3, \ldots, I_n$ supplied by the converters 148 are read and memorised in the control circuits (step 22') and the value $I'_n$ measured by means of the circuit 141 of the central control unit is memorised in the latter (step 23').

The values $I_1, I_2, I_3, \ldots, I_n$ represent the respective positions of the peripherals $10_1, 10_2, 10_3, \ldots, 10_n$ along the common conductor. The value $I'_n$ is normally equal or quasi-equal to $I_n$.

In the following step 24', the position data inserted into the string emitted by the central control unit are calculated in the following manner: $I'_n/n, 2I'_n/n, 3I'_n/n, \ldots, I'_n$ and are associated with the address data of the nodes $N_1, N_2, N_3, \ldots, N_n$.

The values $I'_n/n, 2I'_n/n, 3I'_n/n, \ldots, I'_n$ must normally be equal to $I_1, I_2, I_3, \ldots, I_n$ respectively.

The following steps of extraction, at the level of each peripheral, of the address data item corresponding to its relative position, and of storage or monitoring of the address data item are similar to those of the process of FIGS. 6 and 8.

It will be noted that in the embodiment of FIGS. 6 and 8 the injection of direct current over the common conductor may be carried out continuously, not only during a predetermined period after time after powering-up. The control connection between the circuit for controlling a peripheral and the current source can then be omitted.

In the embodiment of FIGS. 3 and 4 the input of the electric signature at the level of a peripheral is carried out upstream of the shunt.

As a variant, this input may be carried out downstream of the shunt by modifying the point of connection of the current source 120 to the common conductor 18.

Figure 11:
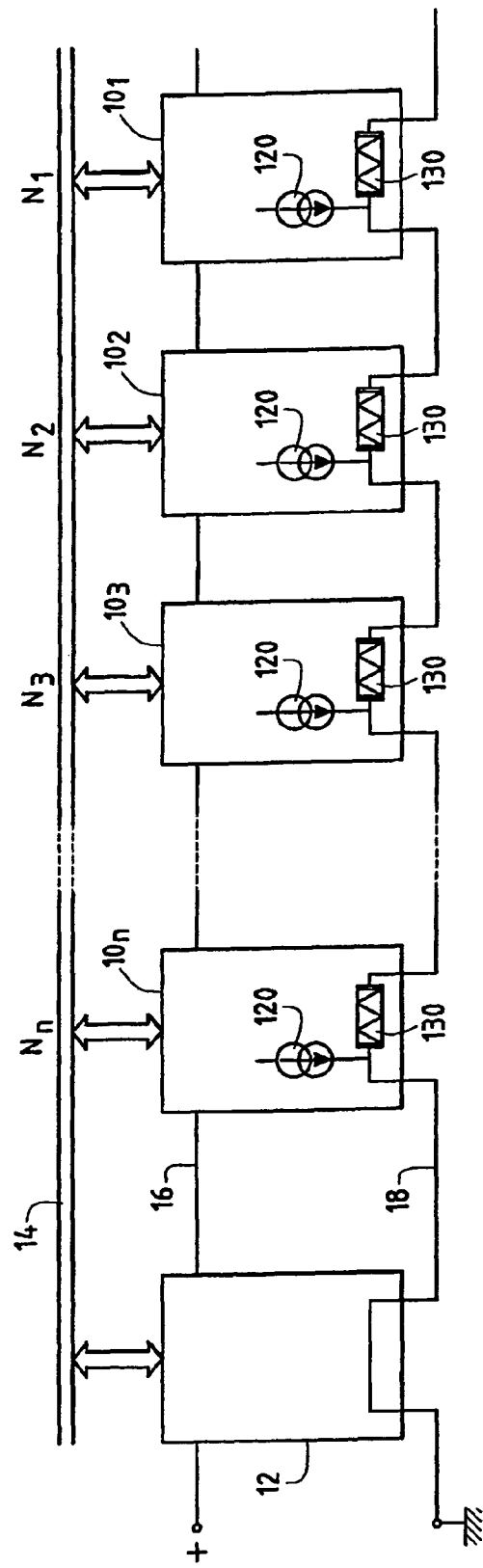
FIG. 11 is a general diagram of a variant of the design of a peripheral of the installation of FIG. 3.

FIG. 11 illustrates another embodiment of the invention. In a similar manner to that described above, each peripheral $10_1$, $10_2, 10_3, \ldots, 10_n$ is provided with a circuit permitting input of an electric signature over the common conductor 18.

Figure 12:
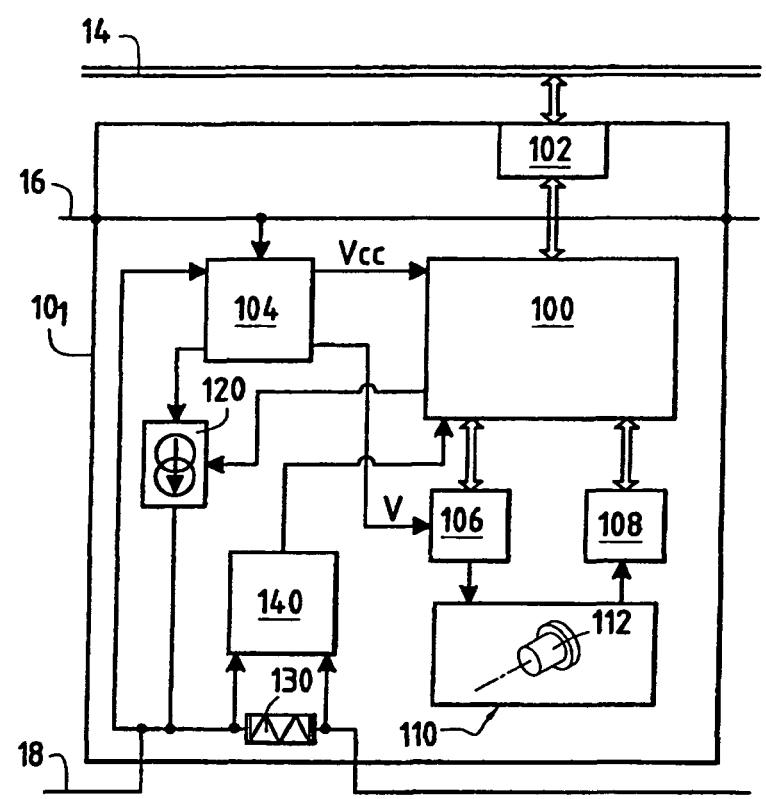
FIG. 12 is a very schematic partial view of a second embodiment of an air conditioning installation according to the invention.

In the example illustrated by this figure and detailed in FIG. 12, the circuit for input of the electric signature consists of a constant direct current source 120 disposed downstream of the shunt 130 inserted in the common conductor 18. In this case a peripheral does not "see" its own signature but only the sum of those of the peripherals situated upstream on the conductor 18. The identification process remains similar to that described above.

The shunt 130 may be located in the peripheral or in the wiring connecting the different peripherals to one another.

Furthermore, a circuit 140 (FIG. 12) is connected to the terminals of the shunt 130 in order to supply a data item representing the intensity of the current passing through this shunt.

The embodiment of the circuit 140 is similar to that shown in FIG. 9. However, the voltage amplified by the amplifier may be transmitted directly to the control circuit 100, omitting the analogue/digital converter.

It will be noted that in this case one of two connections of the shunt, belonging to the peripheral furthest from the control circuit (in this case the peripheral $10_1$), is in the air and consequently no current flows in this shunt.

It will also be noted that in this example a current is detected on a shunt only if at least one of the current sources of the peripherals situated upstream on the common conductor is activated. The term "upstream" is always used in relation to the direction of current flow over the common conductor 18.

By contrast, in this embodiment (FIG. 11), it is not necessary to insert a shunt in the common conductor 18 at the level of the central control unit 12.

A process of identification of the peripherals $10_1$ to $10_n$ will now be described with reference to FIG. 13 in the case of programming of addresses of peripherals connected into the air conditioning installation.

The process is always implemented by means of programs stored in the memory of the central control unit 12 and the control circuits 100 of the peripherals.

Figure 13:
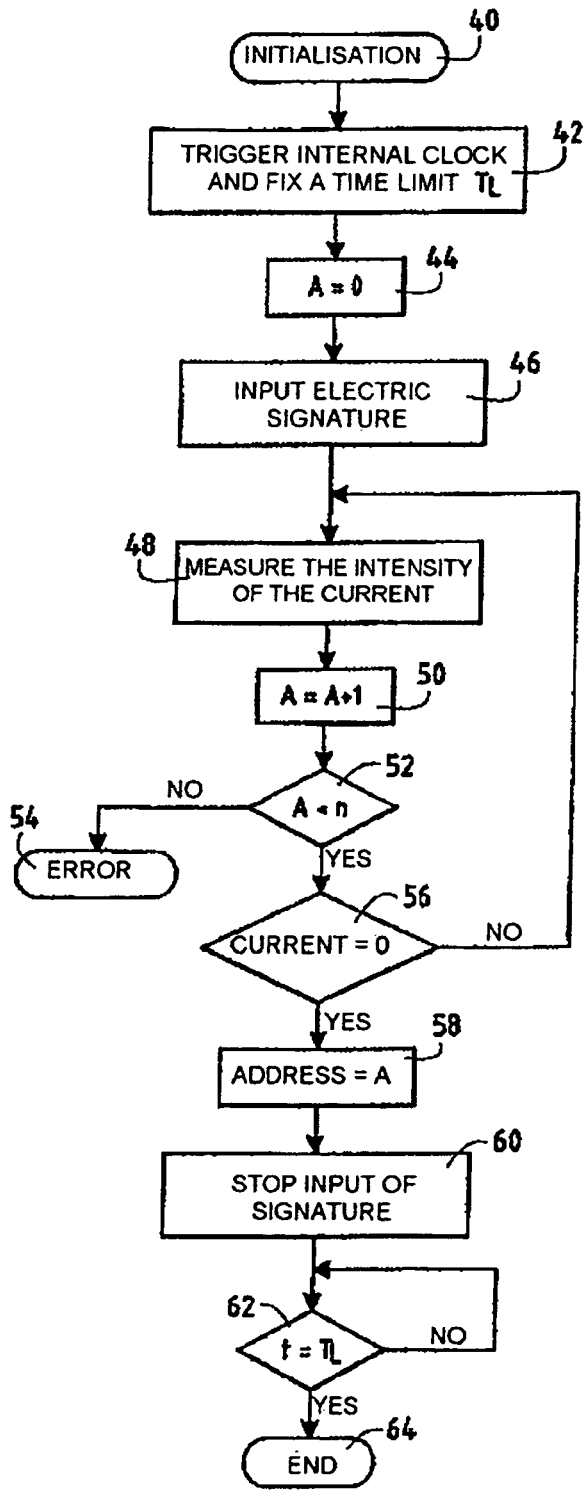
FIG. 13 is a flow chart showing the progress of a method of identification according to the invention which is applied to the assignment of addresses to the network nodes in an installation such as that illustrated by FIG. 12.

FIG. 13 illustrates this process for a given peripheral, in the knowledge that the same steps are carried out for each peripheral.

On powering-up of the installation or during initialisation or re-initialisation 40, the process is started when the peripheral receives an addressing string transmitted by the central control unit 12 via the data bus 14.

The addressing string then triggers an internal clock in the peripheral (step 42) in order to clock, with the aid of its fronts, the succession of actions or tests of the addressing process.

In fact, in a known manner each peripheral may include an oscillator which takes its reference from the synchronisation data included in the addressing string.

Furthermore, in order not to disrupt the addressing process, the peripheral may be rendered deaf to the data circulating in the data bus by deactivation in a known manner of an electronic component responsible for the reception/transmission of data between the data bus and the peripheral.

In step 44, a counter A stored in a memory of the control circuit of the peripheral is initialised by the value zero (A=0).

In the following step 46, an electric signature is input over the common conductor 18. For this purpose, in each peripheral a control signal is delivered by the control circuit 100 in order to inject a direct current of intensity I over the conductor 18 (FIG. 11). The intensities I are injected almost in the same time in the different peripherals and their values may be equal or substantially equal.

By way of example, for a peripheral comprising a stepping motor 112 (FIG. 12) the current source may be obtained by creating a constant electric field at the level of the stator without permitting the rotation of the motor. In this case it is possible to use a Hall-effect sensor, which is known per se, in order to measure the intensity of the current through the shunt.

In step 48, the current intensity passing through each shunt is measured by means of the circuits 140 (or by a Hall-effect sensor).

Furthermore, in a step preceding the injection of the currents, the measuring or detection circuits 140 are activated and the intensity of the open-circuit current, due to the parasitic consumption of current or to a shift error of measuring circuits, is recorded.

The different measurements may be made several times, for example four times, before being averaged. The intensity of the open-circuit current can then be used to correct the measurement of the current intensity passing through the shunt.

Next, the address stored in the memory of the control circuit of the peripheral is incremented (A=A+1) in step 50. Then the value A of the address is compared with the total number n of peripherals in step 52. By way of example n may be equal to or less than thirty.

In the case where the value A is greater than the number n of peripherals, then an error is signalled in step 54. In the opposite case, a test 56 is carried out in order to determine whether the intensity of the current in the shunt is not zero (or definitely is not less than a predetermined minimum threshold value).

In the affirmative, the process returns to step 48 in order to measure the intensity of the current again.

In the opposite case, that is to say if the intensity of the current in the shunt is zero (or less than a minimum threshold value), the address value A stored in the memory of the control circuit of the peripheral is finally designated as the address of this peripheral (step 58).

Next the injection of the current into this peripheral is stopped (step 60) and the electronic component responsible for the reception/transmission of the data between the data bus and the peripheral is then reactivated in order to permit normal operation of the system. Finally, as soon as the time allocated for addressing (step 62) has run out, the process is terminated (step 64).

Figure 15:
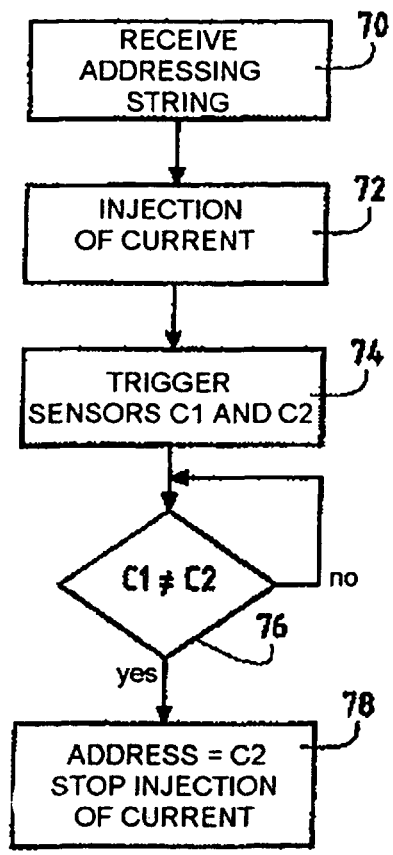
FIG. 15 is a flow chart showing the progress of a method of identification according to the invention which is applied to the assignment of addresses to the network nodes in an installation such as that illustrated by FIG. 13.

The process of FIG. 13 may be modified in the manner illustrated by FIG. 15, where no measurement of the intensity of the current is necessary.

Figure 14:
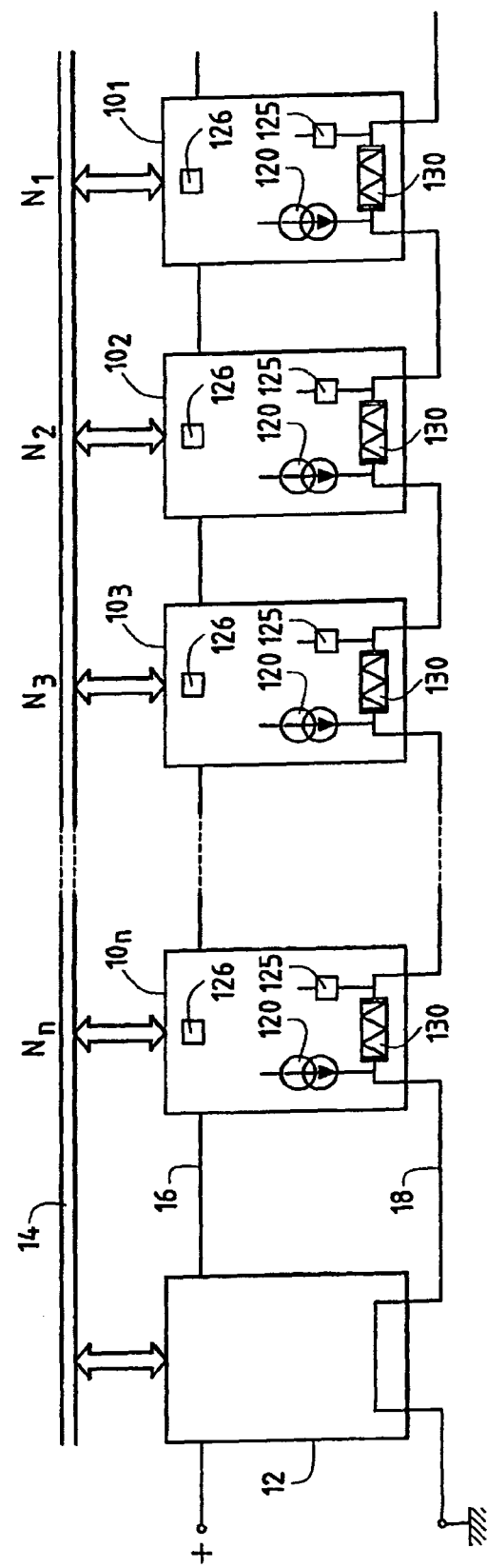
FIG. 14 is a variant of FIG. 13.

In effect, FIG. 14 illustrates very schematically an air conditioning installation similar to that of FIG. 12 but having a first counter 125 which is only active if there is a current through the shunt and a second counter 126 which does not depend for its operation upon the current through the shunt.

The flow chart of FIG. 15 shows that after the reception by the peripheral of the addressing string coming from the central control unit (step 70), a current is injected almost simultaneously into each peripheral (step 72).

Next, two internal clocks or counters C1 and C2 are triggered (step 74). The first counter C1 only counts units of time if the shunt has a current passing through it, whilst the second counter C2 counts the same units of time independently of the current.

As soon as the two counters do not have the same value (test of step 76), the value of the second counter is stored in the memory of the control circuit of the peripheral as being its address and the injection of the current is stopped (step 78).

It will be noted that according to the processes of FIGS. 13 and 15 the peripheral which does not detect any current (or measures a current less than a minimum value in the case of FIG. 13) through its shunt generates an address independently of the status of the other peripherals.

Naturally, each peripheral will not detect any current (or will measure a current less than a minimum value) at a certain moment in the addressing process and in manner which is sequential in time.

Figure 16:
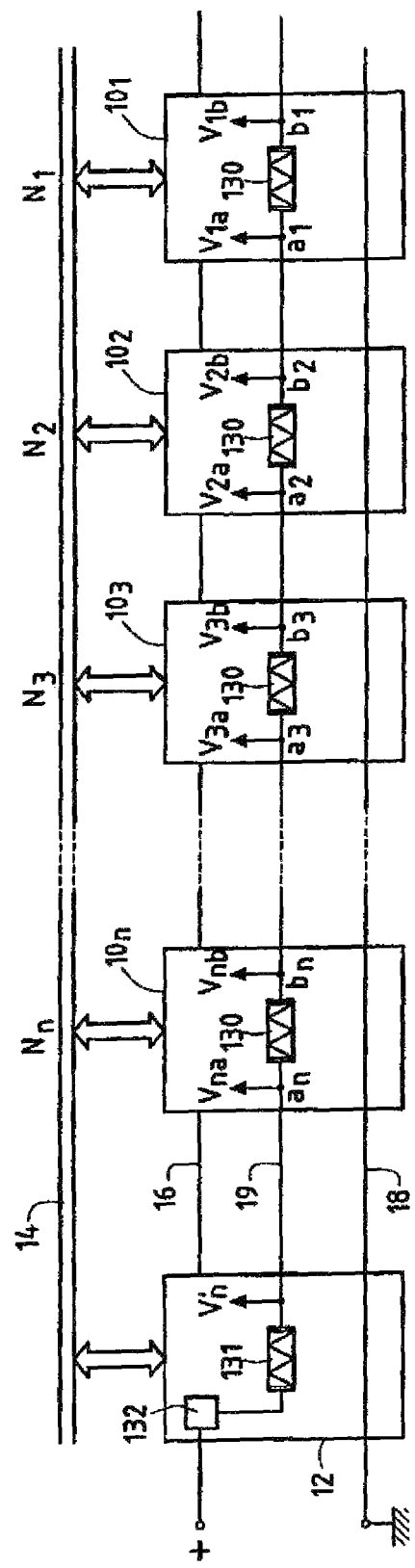
FIG. 16 is a very schematic partial view of a third embodiment of an air conditioning installation according to the invention.

FIG. 16 illustrates another embodiment of the invention. In this example shunts are inserted into a supplementary common conductor 19 connecting the peripherals to a reference potential. Electric signatures are input at the level of the peripherals on the conductor 19 by a circuit disposed in the central control unit 12 having a filter 132 and a resistor 131.

In fact, a voltage tapped on the supply line 16 is filtered and stabilised by the filter 132 in order to form with the resistor 131 a voltage source where the potential at the output of the resistor is denoted $V'_n$ and where the potentials at the terminals $a_i$, $b_i$ of each resistor or shunt 130 at the level of each peripheral are denoted $V_i a$ and $V_i b$, i being an index between 1 and n.

It will be noted that in this case one of the two connections of the shunt, belonging to the peripheral furthest from the control circuit 12 (more precisely, the terminal $b_1$ of the shunt belonging to the peripheral 10₁), is connected to the common conductor 18 which is connected to earth. Consequently the potential $V_1 b$ on the terminal $b_1$ of the shunt is equal to zero ($V_1 b=0$).

Figure 17:
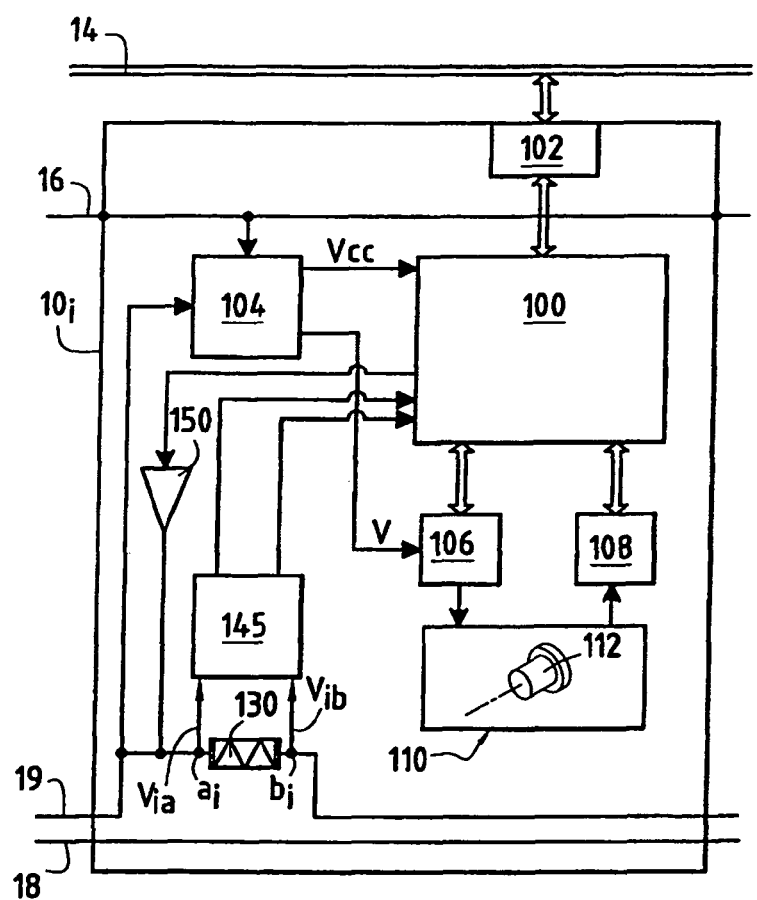
FIG. 17 is a general diagram of a peripheral of the installation of FIG. 16.

In the example illustrated by FIG. 17, a circuit 145 (similar to that shown in FIG. 9) is connected to the terminals of the shunt 130 in order to supply a data item representing the potentials $V_i a$ and $V_i b$ at the terminals $a_i$, $b_i$ of this shunt.

Furthermore, a switch or circuit 150 for control of closure to earth is connected between the common conductor 19 at the level of the terminal $a_i$ of the shunt and the control circuit 100. In other words, the closure of the switch 150 connects the terminal $a_i$ of the shunt to earth.

Figure 18:
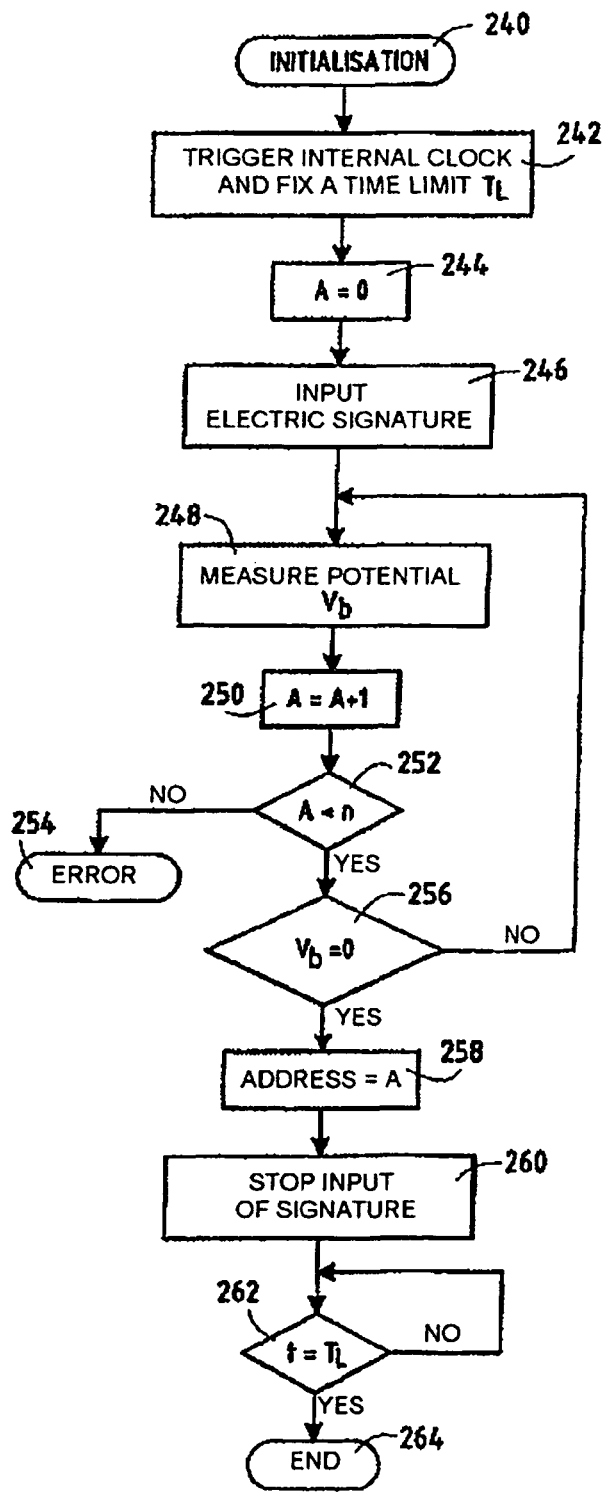
FIG. 18 is a flow chart showing the progress of a method of identification according to the invention which is applied to the assignment of addresses to the network nodes in an installation such as that illustrated by FIG. 17.

A process of identification of the peripherals 10₁ to 10ₙ is illustrated in FIG. 18, in the knowledge that the same steps are carried out for each peripheral. It is distinguished from that of FIG. 13 in the following manner.

The input of an electric signature in step 246 is carried out by opening of the switch 150 (FIG. 17). Thus the potential $V_i a$ upstream of the shunt is not zero.

In step 248 the potential $V_ib$ is measured or detected by the circuit 145 and as soon as its value is zero (step 256) the address of the peripheral is defined by the value of the counter A.

Next, the switch is closed (the terminal $a_i$ is connected to earth) in order to stop injection of the potential at the level of this peripheral (step 260).

Figure 19:
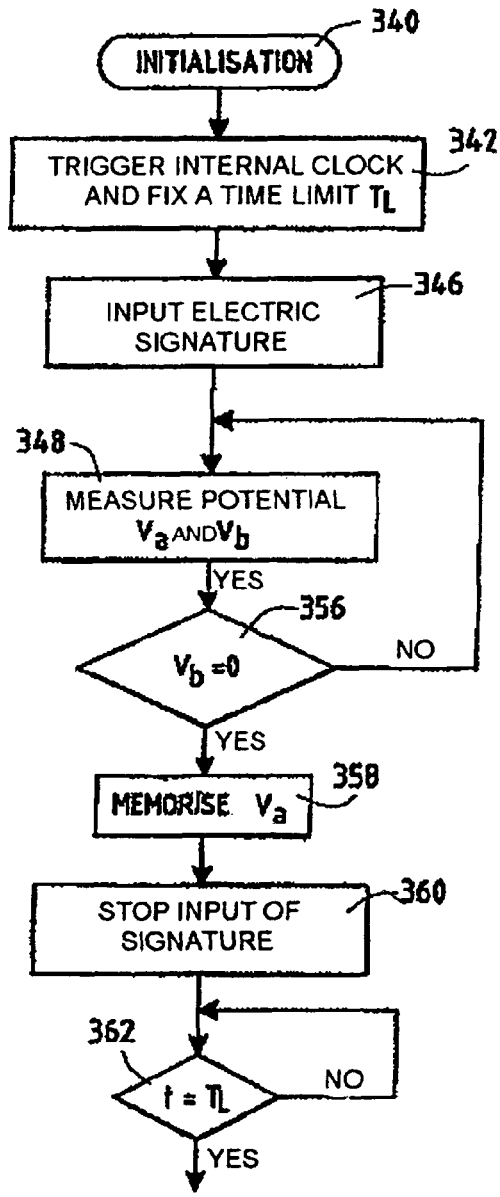
FIGS. 19 and 20 are flow charts showing the progress of a method of identification according to the invention which is applied to the assignment of addresses to the network nodes in an installation such as that illustrated by FIG. 17.
Figure 20:
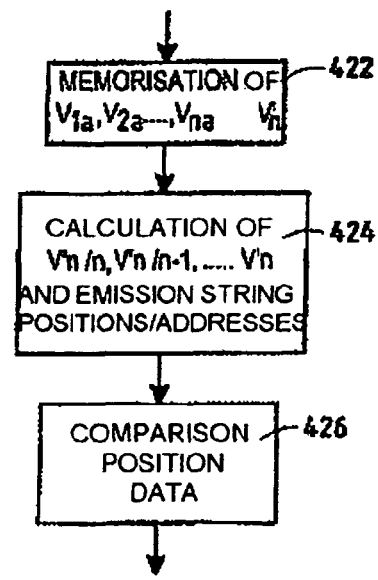

The process of FIG. 18 may also be modified in the manner illustrated by FIGS. 19 and 20.

In fact, immediately after opening of a switch 150 (step 346), the potentials $V_ia$ and $V_ib$ at the terminals of the shunt are measured and if the potential $V_ib$ is zero the value of the potential $V_ia$ is memorised (step 358) in the memory of the control circuit of the peripheral before the switch is closed (step 360).

The values $V_1a, V_2a, \ldots, V_na$ are then memorised in the control circuits of the respective peripherals. The value $V_n$ measured by means of a circuit (not shown) of the central control unit is memorised in the latter (step 422).

The values $V_1a, V_2a, V_3a, \ldots, V_na$ represent the respective positions of the peripherals $10_1, 10_2, 10_3, \ldots, 10_n$ along the common conductor 19.

In the case where all the resistors 130 have the same value, thus according to the voltage divider rule, the value $V_1a=nV_2a=(n-1)V_3a, \ldots, =V_na$.

In the following step 424, the position data inserted into the string emitted by the central control unit are calculated in the following manner: $V_n'/n, V_n'/(n-1), 3V_n'/(n-2), \ldots, V_n'$ and are associated with the address data of the nodes $N_1, N_2, N_3, \ldots, N_n$.

The following steps of extraction, at the level of each peripheral, of the address data item corresponding to its relative position, and of storage or monitoring of the address data item are similar to those of the processes of FIGS. 6 and 8.

Equally, a process of monitoring connected peripherals with their addresses memorised by hardware or software means may also be applied. This monitoring process is similar to that of FIG. 10.

Figure 21:
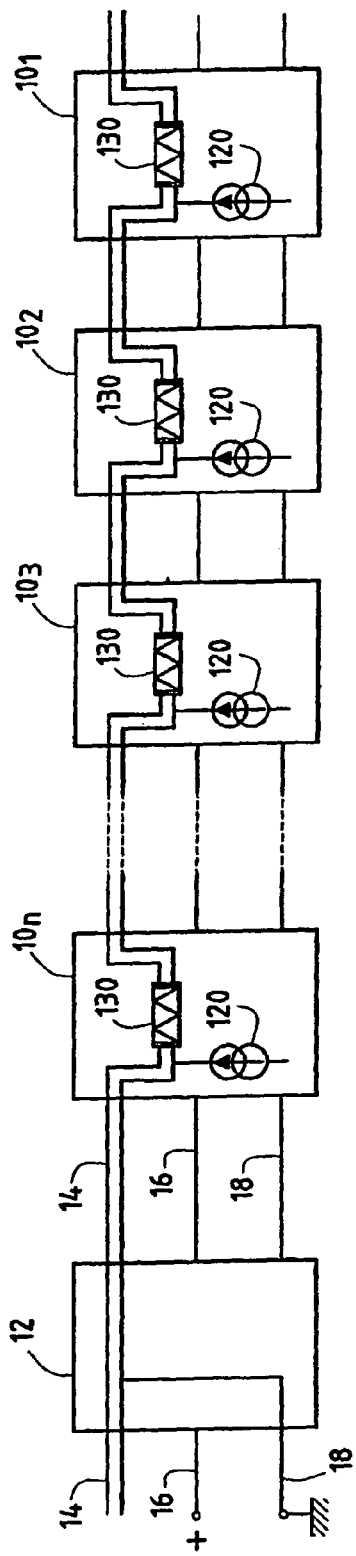
FIG. 21 is a very schematic partial view of a fourth embodiment of an air conditioning installation according to the invention.

FIG. 21 illustrates another embodiment of the invention. Each peripheral $10_1, 10_2, 10_3, \ldots, 10_n$ is provided with a circuit permitting the input of an electric signature on the data bus 14.

The data bus 14 is connected to the common conductor 18 which is connected to earth.

The circuit for input of an electric signature is formed by a constant direct current source 120 downstream of the shunt 130 and a circuit (not shown) analogous to the circuit 140 of the figure is connected to the terminals of the shunt 130 in order to supply a data item representing the intensity of the current passing through this shunt.

Figure 22:
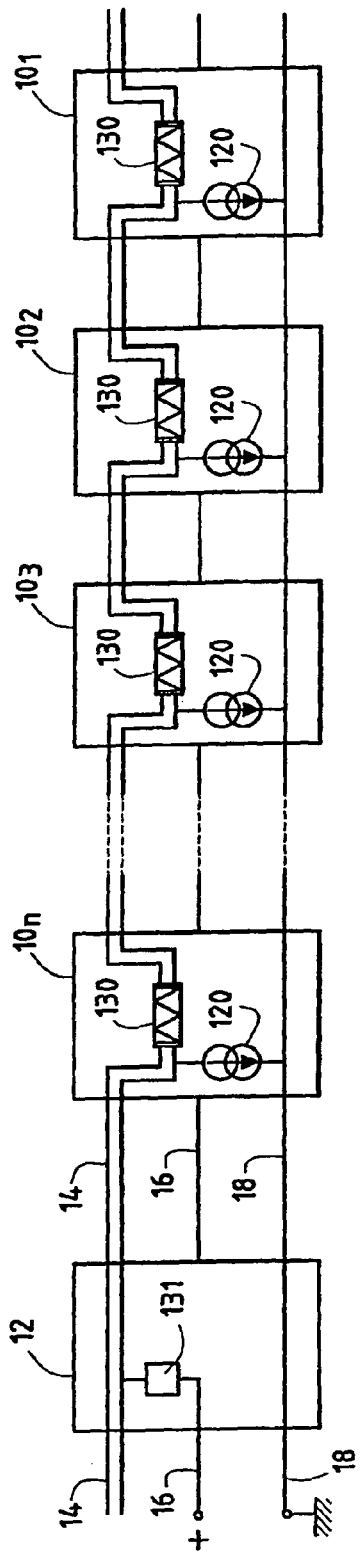
FIG. 22 is a variant of FIG. 21.

FIG. 22 is a variant of FIG. 21 where the data bus 14 is connected by way of a resistor 131 to the common supply conductor 16.

In this case, these are the nodes or peripherals which draw to earth by way of the injection circuits 120 or switches monitored by control circuits of the peripherals. In this case the current injected at the level of the peripheral is a negative current and consequently the direction in which it passes through is the reverse of that in the preceding case.

The identification process for the examples illustrated by FIGS. 21 and 22 remains similar that described above with reference to FIG. 13.

Thus a data item representing a relative position of the peripheral associated with an address data item is elaborated or generated at the level of each peripheral on the basis of detection of a current passing through the data bus 14 at the level of each peripheral.

Equally, an identification process analogous to that described above with reference to FIG. 15 remains worthwhile when two counters are used in a manner similar to that of FIG. 14.

Finally, although the input of electric signatures in the form of currents of constant intensity was envisaged above, other possibilities for producing electric signatures may be envisaged, for example by using various waveforms.

The invention claimed is:

1. A method of identification of the nodes ($N_1$, $N_2$, $N_3, \ldots, N_n$) of a computer network in an air conditioning installation of a motor vehicle comprising a plurality of peripherals ($10_1, 10_2, 10_3, \ldots, 10_n$) connected to respective nodes of a computer network connected to a central control unit (12), said method comprising the steps of:

inputting at the level of each peripheral an electric signature on a common conductor (14; 16; 18), detecting at the level of each peripheral the electric signatures of the peripherals situated upstream on the common conductor (14; 16; 18), said electric signatures being picked up on a shunt (130) inserted into the common conductor (14; 16; 18) connecting the peripherals in series, generating at the level of each peripheral a data item representing a relative position of the peripheral on the basis of the electric signal detected at the level of this peripheral, identifying each node of the network on the basis of the relative position data collected by the peripheral connected to this node, and wherein the electric signature is input on the common conductor (14; 18) by a current source (120) in the form of a current of predetermined constant intensity and wherein the data item representing the relative position of a peripheral is generated on the basis of the measurement of the intensity of the current passing through the common conductor (14; 18) at the level of this peripheral, and wherein after input of the electric signatures at the level of the peripherals, a data string is transmitted by the central control unit (12) over the computer network (14), the data string comprising relative position data of peripherals each associated with a respective address data item, and each peripheral extracts from the data string transmitted the address data item associated with the relative position data item corresponding to that generated at the level of this peripheral; and programming addresses of the nodes ($N_1, N_2, N_3, \ldots, N_n$) of the network, wherein the address data item is extracted at the level of a peripheral and is recorded as the address of the node to which this peripheral is connected and wherein the address data item is stored in a volatile manner such that the programming of addresses is reinitialised at each powering-up of the air conditioning installation, and that the peripherals of one and the same type are undifferentiated when the air conditioning installation is not powered up.

2. A method as claimed in claim 1, wherein the common conductor is a conductor (18; 19) connecting the peripherals to a reference potential.

3. A method as claimed in claim 1, wherein the common conductor is the computer network (14) connecting the peripherals ($10_1, 10_2, 10_3, \ldots, 10_n$) to the central control unit (12).

4. A method as claimed in claim 1, further comprising the step of monitoring the connection of peripherals ($10_1, 10_2, 10_3, \ldots, 10_n$) on the nodes ($N_1, N_2, N_3, \ldots, N_n$) of the computer network, wherein the address data item extracted at the level of a peripheral is compared with an address data item stored in a permanent manner at the level of this peripheral.

5. A motor vehicle air conditioning installation comprising a central control unit (12), a computer network connected to the central control unit (12) and a plurality of peripherals (10$_1$, 10$_2$, 10$_3$, . . . , 10$_n$) connected to nodes (N$_1$, N$_2$, N$_3$, . . . , N$_n$) of the computer network, wherein the peripherals are connected in series via a common conductor (14; 18; 19), and the installation comprises:

means for inputting at the level of each peripheral an electric signature on a common conductor (14; 18; 19), a shunt disposed within the common conductor (14; 18; 19) at the level of each peripheral for detecting the electric signatures of the peripherals situated upstream on the common conductor (14; 18; 19), means for generating at the level of each peripheral a data item representing a relative position of the peripheral on the basis of the electric signature detected at the level of this peripheral, wherein the means for generating a data item representing a relative position comprise means for measuring (140) the intensity of the current passing through the common conductor (14; 18) at the level of each peripheral, wherein after input of the electric signatures at the level of the peripherals, a data string is transmitted by the central control unit (12) over the computer network (14), the data string comprising relative position data of peripherals each associated with a respective address data item, and at each peripheral, means for extracting from the data string transmitted the address data item associated with the relative position data item corresponding to that generated at the level of this peripheral;

means for identifying each node of the network on the basis of the relative position data collected by the peripheral connected to this node; and means for programming addresses of the nodes (N$_1$, N$_2$, N$_3$, . . . , N$_n$) of the network, wherein the address data item is extracted at the level of a peripheral and is recorded as the address of the node to which this peripheral is connected and wherein the address data item is stored in a volatile manner such that the programming of addresses is reinitialised at each powering-up of the air conditioning installation, and that the peripherals of one and the same type are undifferentiated when the air conditioning installation is not powered up.

6. An installation as claimed in claim 5, wherein the common conductor is a conductor (18; 19) connecting the peripherals to a reference potential.

7. An installation as claimed in claim 5, wherein the common conductor is the computer network (14) connecting the peripherals to the central control unit (12).

8. An installation as claimed in claim 5, wherein each peripheral comprises means for comparing the relative position data item generated on the basis of the detection of the electric signature with relative position data transmitted over the computer network (14) in association with address data.

9. An installation as claimed in claim 5, wherein the means for generating a data item representing a relative position associated with an address data item comprise means for detecting the intensity of the current passing through the common conductor (14; 18) at the level of each peripheral.

10. An installation as claimed in claim 8, wherein each peripheral comprises means for comparing the address data item associated with the corresponding relative position data item with that generated with a pre-recorded address data item.

\* \* \* \* \*